US010274007B2

(12) United States Patent
Luo (10) Patent No.: US 10,274,007 B2
(45) Date of Patent: Apr. 30, 2019

(54) HYBRID DYNAMIC PRESSURE GAS THRUST BEARING

(71) Applicant: Lifeng Luo, Shanghai (CN)

(72) Inventor: Lifeng Luo, Shanghai (CN)

( * ) Notice: Subject to any disclaimer, the term of this patent is extended or adjusted under 35 U.S.C. 154(b) by 0 days.

(21) Appl. No.: 15/575,604

(22) PCT Filed: May 19, 2015

(86) PCT No.: PCT/CN2015/079234
§ 371 (c)(1),
(2) Date: Nov. 20, 2017

(87) PCT Pub. No.: WO2016/183788
PCT Pub. Date: Nov. 24, 2016

(65) Prior Publication Data
US 2018/0156267 A1   Jun. 7, 2018

(51) Int. Cl.
*F16C 17/04* (2006.01)
*F16C 33/02* (2006.01)
*F16C 33/10* (2006.01)
*F16C 17/08* (2006.01)

(52) U.S. Cl.
CPC .......... *F16C 17/045* (2013.01); *F16C 17/042* (2013.01); *F16C 17/08* (2013.01); *F16C 33/02* (2013.01); *F16C 33/1015* (2013.01); *F16C 2300/22* (2013.01)

(58) Field of Classification Search
CPC ...... F16C 17/042; F16C 17/045; F16C 17/10; F16C 17/102; F16C 17/107; F16C 17/08; F16C 33/02; F16C 33/1015; F16C 2300/22
See application file for complete search history.

(56) References Cited

U.S. PATENT DOCUMENTS 4,199,329 A * 4/1980 Bouchard .............. B01D 57/00
                                                     277/424
4,225,196 A * 9/1980 Gray .................... F16C 17/042
                                                     384/121
4,227,752 A * 10/1980 Wilcock ................ F16C 17/042
                                                     384/106

(Continued)

OTHER PUBLICATIONS

Machine Translation of CN 202091349 (Year: 2011).*

*Primary Examiner* — Alan B Waits
(74) *Attorney, Agent, or Firm* — Ware, Fressola, Maguire & Barber LLP (57) ABSTRACT

A hybrid dynamic pressure gas thrust bearing, comprises two outer discs, an inner disc clamped between the two outer discs, and foil type elastic parts arranged between each outer disc and the inner disc; and the two end faces of the inner disc are respectively provided with regular groove-type patterns, and the groove-type pattern in one end face is in mirror symmetry with the groove-type pattern in the other end face. The hybrid dynamic pressure gas thrust provided by the invention has the rigidity characteristic of the high-limit rotating speed of the groove-type dynamic pressure gas thrust bearing, and has the flexible characteristic of the high impact resistance and the load capacity of the foil type dynamic pressure gas thrust bearing, it can meet the application of dynamic pressure gas thrust bearings in ultra high-speed areas under larger loads.

10 Claims, 6 Drawing Sheets

(56) References Cited

U.S. PATENT DOCUMENTS

| | | | | |
|---|---|---|---|---|
| 4,277,111 A * | 7/1981 | Gray | .................... | F16C 17/042 |
| | | | | 384/124 |
| 4,277,112 A * | 7/1981 | Heshmat | ............... | F16C 17/042 |
| | | | | 384/124 |
| 4,459,047 A * | 7/1984 | Silver | .................. | F16C 17/024 |
| | | | | 384/103 |
| 4,597,677 A * | 7/1986 | Hagiwara | ............. | F16C 17/042 |
| | | | | 384/105 |
| 5,795,074 A * | 8/1998 | Rahman | ................ | F16C 17/045 |
| | | | | 384/121 |
| 6,900,567 B2 * | 5/2005 | Aiello | ................... | F16C 17/107 |
| | | | | 310/90 |
| 8,618,706 B2 * | 12/2013 | Grantz | ................. | F16C 33/745 |
| | | | | 310/90 |
| 2014/0199006 A1 * | 7/2014 | Park | ....................... | F16C 17/10 |
| | | | | 384/105 |
| 2015/0219147 A1 * | 8/2015 | Furuno | ................ | F16C 17/047 |
| | | | | 384/105 |
| 2015/0330443 A1 * | 11/2015 | Omori | ................... | F01D 25/168 |
| | | | | 384/223 |
| 2016/0195129 A1 * | 7/2016 | Omori | ................... | F16C 17/042 |
| | | | | 384/105 |
| 2016/0319859 A1 * | 11/2016 | Omori | ................... | F16C 17/042 |

* cited by examiner

HYBRID DYNAMIC PRESSURE GAS THRUST BEARING

TECHNICAL FIELD

The invention relates to a dynamic pressure gas thrust bearing, in particular to a hybrid dynamic pressure gas thrust bearing, which relates to a rigid characteristic of a high-limit rotating speed of a thrust bearing of a groove-type dynamic pressure gas and the flexible characteristic of the high impact resistance and the load capacity of the foil type dynamic pressure gas thrust bearing, belongs to the technical field of gas bearings.

BACKGROUND

The gas bearing has the advantages of being high in speed, high in precision, resistant to high temperature and small in friction loss, long in service life and the like. After the rapid development of recent decades, the gas bearing has been widely applied to the fields of high-speed supporting, high-precision supporting and the like. At present, various types of gas bearings have been developed, and the gas bearings are mainly divided into a dynamic pressure type and a static pressure type.

The dynamic pressure gas bearing takes gas as a lubricant, and a gas film is formed between the shaft and the bearing. It is a bearing form that the moving face is not in direct contact with the static face, and it has many advantages such as no pollution, low friction loss, wide temperature range, smooth operation, long use time and high working speed. Due to the small friction loss, and not necessary to use liquid lubricating oil, it is widely used in the field of high-speed rotary applications. In particular, it is often used in ultra-high-speed application field which is usually supported by a rolling bearing and where liquid lubricants are not suitable.

The dynamic pressure gas thrust bearing is formed by the relatively moving two working faces forming a wedge-shaped space. When they are relatively moved, the gas is driven by its own viscous action and compressed into the wedge-shaped gap, thereby generating dynamic pressure to support the load. Different structural forms of gas dynamic pressure thrust bearings due to structural differences, the work process is slightly different. At present, the more common types of dynamic pressure thrust bearing structure are a tilting pad type, a groove type and a foil type.

The tilting pad type dynamic pressure gas thrust bearing is a kind of excellent dynamic pressure gas bearing with self-adjusting performance, which can work safely in the space of smaller air gap, and is not sensitive to thermal deformation, elastic deformation and so on, and the machining precision is easy to be guaranteed, and it has the outstanding advantages of being capable of automatically tracking the change of the load. At present, it is mainly used in large-scale high-speed rotating machinery and turbine machinery at home and abroad. But its bearing structure is more complex, the installation process is complex, is higher than the general thrust bearing requirements, thus its application is limited.

Although the foil type dynamic pressure thrust bearing with elastic support, can make the bearing to obtain a certain bearing capacity and alleviate the impact vibration capacity, but the foil bearing is usually made of metal foil sheets, there are still some problems in the material manufacturing technology and processing technology, the damping value of the bearing can not be greatly improved, so that the rigidity of the bearing is not enough, the critical rotating speed of the bearing is low, and the bearing is easy to instability and even stuck during high-speed operation.

The groove type dynamic pressure gas thrust bearing has good stability, and the certain stability is achieved even under no load; moreover, at a high speed, the static bearing capacity is larger than that of other forms of bearings. At present, it is mostly used for small-sized high-speed rotating machines, and used as a bearing in precision machinery, such as a gyroscope and a magnetic drum. However, due to the fact that the groove type dynamic pressure gas thrust bearing is high in rigidity, so that the impact resistance is not good enough, the load capacity is not large enough, and high-speed operation under a large load cannot be realized.

How to realize the hybrid dynamic pressure gas thrust bearing which has the rigid characteristics of high-limit rotating speed of the thrust bearing of groove-type dynamic pressure gas, and has the flexible characteristic of the high impact resistance and the load capacity of the foil type dynamic pressure gas thrust bearing, is not only a target which is expected to be realized by researchers in the field, but also to achieve the application of dynamic pressure thrust bearings in the larger load under the ultra-high-speed field has important value and far-reaching significance.

SUMMARY

In view of the problems and requirements of the prior art discussed above, it is an object of the present invention to provide hybrid dynamic pressure gas thrust bearing which has the rigid characteristics of high-limit rotating speed of the thrust bearing of groove-type dynamic pressure gas, and has the flexible characteristic of the high impact resistance and the load capacity of the foil type dynamic pressure gas thrust bearing, and to achieve the application of dynamic pressure gas thrust bearings in the ultra-high-speed areas under larger load.

To achieve the above object, the subject matter of the present invention is as follow:

A hybrid dynamic pressure gas thrust bearing, comprises two outer discs, an inner disc clamped between the two outer discs, and foil type elastic parts arranged between each outer disc and the inner disc; and the two end faces of the inner disc are respectively provided with regular groove-type patterns, and the groove-type pattern in one end face is in mirror symmetry with the groove-type pattern in the other end face.

An implementation scheme, groove-type patterns are also arranged in the outer circumferential face of the inner disc, and the shape of the groove-type pattern in the outer circumferential face is the same as the shape of the groove-type pattern in the left and right end faces, and the axial contour lines of the groove-type patterns in the outer circumferential face and the radial contour lines of the groove-type patterns in the left and right end faces are in one-to-one correspondence and are connected with each other.

An implementation scheme, the axial high-position lines of the groove-type patterns in the outer circumferential face correspond to the radial high-position lines of the groove-type patterns in the left and right end faces, and are connected with each other in front of the circumferential chamfer in the end face; and the axial middle-position lines of the groove-type patterns in the outer circumferential face correspond to the radial middle-position lines of the groove-type patterns in the left and right end faces, and are connected with each other in front of the circumferential chamfer in the end face; and the axial low-position lines of the groove-type patterns in the outer circumferential face correspond to the radial low-position lines of the groove-type patterns in the left and right end faces, and are connected with each other in front of the circumferential chamfer in the end face.

An implementation scheme, the groove-type pattern is of an impeller shape.

As a preferable scheme, a fit clearance between the foil type elastic part and the inner disc is 0.003-0.008 mm.

As a preferable scheme, at least one end of the foil type elastic part is fixed in the inner end face of the corresponding outer disc.

As a preferable scheme, the number of the foil type elastic parts on each outer disc is multiple, and the foil type elastic parts are uniformly distributed along the inner end face of the corresponding outer disc.

As a more preferable scheme, the foil type elastic part fixed on one outer disc is in mirror symmetry with the foil type elastic part fixed on the other outer disc.

As a more preferable scheme, a clamping groove used for fixing the foil type elastic part is formed in the inner end face of the outer disc.

As a preferable scheme, the foil type elastic part is subjected to surface heat treatment.

An implementation scheme, the foil type elastic part is composed of a wave foil and a flat foil, the top end of the arc-shaped protrusion of the wave foil is attached to the flat foil, the transition bottom edge of the wave arch of the wave foil is attached to the inner end face of the corresponding outer disc.

Compared to the prior art, the present invention offers the following benefits:

The foil type elastic part is arranged between the outer disc and the inner disc, and groove-type patterns with regular shape are arranged in the left and right end faces of the inner disc, and the groove-type pattern in one end face is in mirror symmetry with the groove-type pattern in the other end face, so that the hybrid dynamic pressure gas thrust bearing is obtained, which has the rigidity characteristic of the high-limit rotating speed of the groove-type dynamic pressure gas thrust bearing, and has the flexible characteristic of the high impact resistance and the load capacity of the foil type dynamic pressure gas thrust bearing. Compared with an existing simple groove-type dynamic pressure gas thrust bearing, it has the anti-impact capacity and the load capacity which are increased in a multiplied mode at the same rotating speed; and compared with an existing pure foil type dynamic pressure gas thrust bearing, it has the limit rotating speed which is increased by times under the same load; through the test, the hybrid dynamic pressure gas thrust bearing provided by the invention can be realized the limit rotating speed of 200,000 rpm to 450,000 rpm under a load of 1-3 kg, but the existing dynamic pressure gas thrust bearing can only achieve a load capacity of 0.5-1.5 kg, the maximum limit rotating speed can only reach 100,000 rpm to 200,000 rpm. It can be seen that the present invention can realize the application of dynamic pressure gas thrust bearings in ultra high-speed areas under larger loads. Compared with the prior art, the present invention has made significant progress, and made the study of the dynamic bearing gas thrust bearing technology take a new step.

REFERENCE NUMERALS IN THE FIGURES DENOTE AS FOLLOWS 1, outer disc; 11, left outer disc; 12, right outer disc; 13, clamping groove; 2, inner disc; 21, groove-type pattern in the left end face; 211, radial high-position line; 212, radial middle-position line; 213, radial low-position line; 22, groove-type pattern in the right end face; 221, radial high-position line; 222, radial middle-position line; 223, radial low-position line; 23, groove-type pattern in the outer circumferential face; 231, axial high-position line; 232, axial middle-position line; 233, axial low-position line; 3, foil type elastic part; 3a, foil type elastic part fixed on the left outer disc; 3b, foil type elastic part fixed on the right outer disc; 31, wave foil; 311, arc-shaped protrusions; 312, transition bottom edges between the wave arches; 32, flat foils; 33, fixed end.

DETAILED DESCRIPTION

The subject matter of the present invention will be described in further detail below with reference to several embodiments and the accompanying drawings.

Example 1

Figure 1:
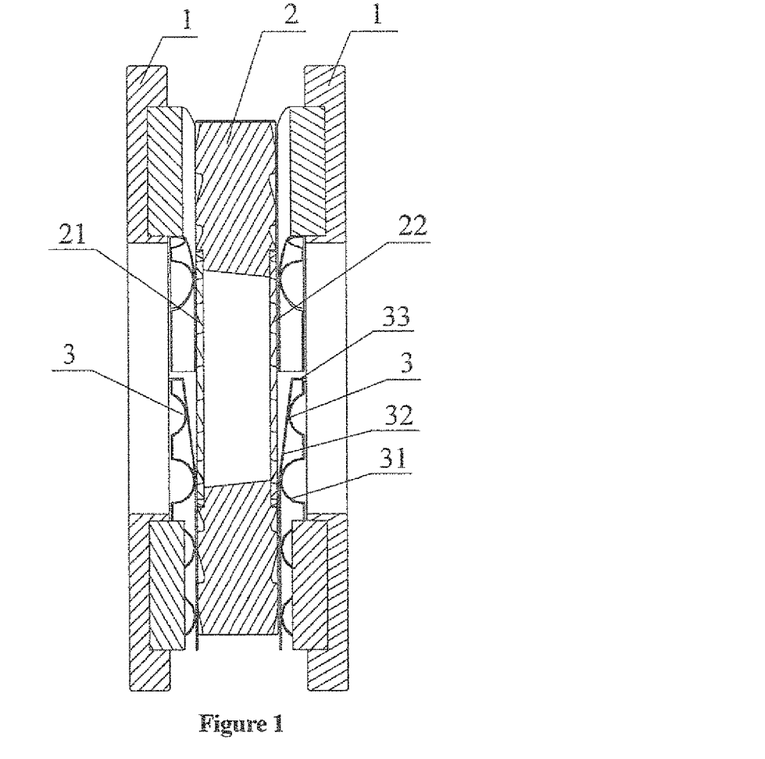
FIG. 1 is a schematic cross-sectional view of a hybrid dynamic pressure gas thrust bearing according to embodiment 1 of the present invention.

As shown in FIG. 1, the hybrid dynamic pressure gas thrust bearing provided by the embodiment of the invention, includes two outer discs 1, an inner disc 2 is clamped between the two outer discs 1, a foil type elastic part 3 is arranged between each outer disc 1 and the inner disc 2, the regular groove-type patterns 21 are arranged in the left end face and a regular groove-type patterns 22 are arranged in the right end face of the inner disc 2.

Figure 2A:
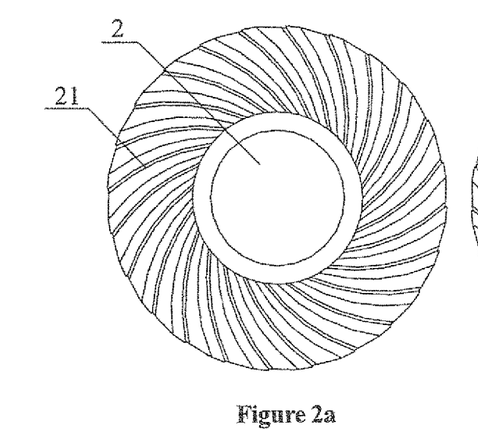
FIG. 2a is a left view of the inner disc of embodiment 1.
Figure 2B:
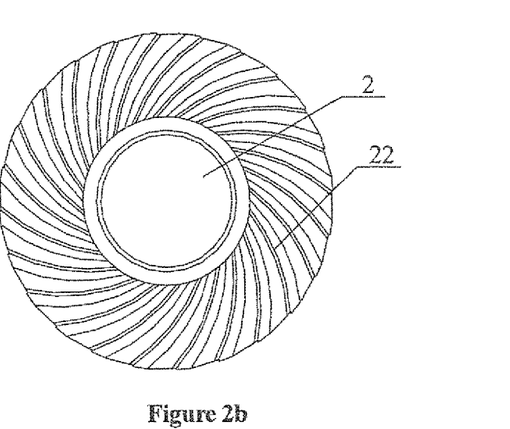
FIG. 2b is a right view of the inner disc of embodiment 1.

With combined reference to FIGS. 2a and 2b, it can be seen that: the groove-type patterns 21 in the left end face of the inner disc 2 are in mirror symmetry with the groove-type patterns 22 in the right end face of the inner disc 2. The radial contour lines of the groove-type patterns 21 in the left end face and the groove-type patterns 22 in the right end face are in one-to-one correspondence and are connected with each other. The groove-type patterns 21 and 22 are the same in shape. In the embodiment, the shape of the impeller is the shape of an impeller.

Figure 3A:
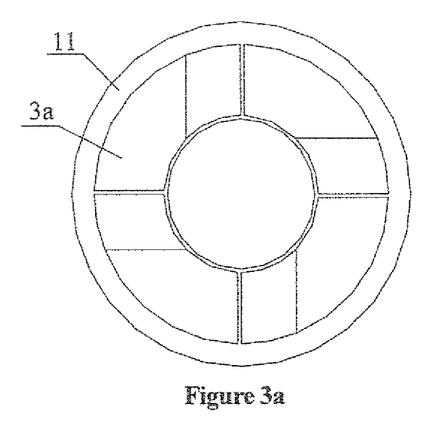
FIG. 3a is a right view of the left outer disc with a foil type elastic part fixed in a first embodiment.
Figure 3B:
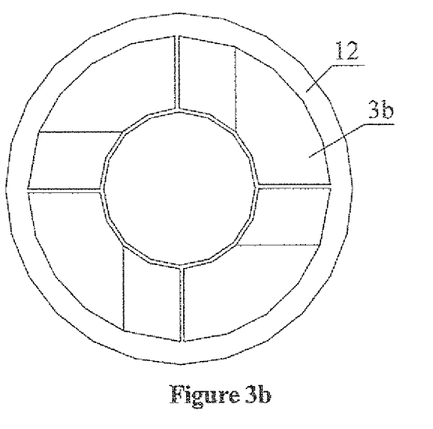
FIG. 3b is left view of the right outer disc with a foil type elastic part fixed in a first embodiment.

Further, in combination with FIG. 3a and FIG. 3b, it can be seen that: the foil type elastic part 3 is fixed in the inner end face of the corresponding outer disc 1 (for example, the left outer disc 11 fixed with a foil type elastic part 3a in FIG. 3a and the right outer disc 12 fixed with a foil type elastic part 3b in FIG. 3b), and the foil type elastic part 3a fixed on the left outer disc 11 is in mirror symmetry with the foil type elastic part 3b fixed on the right outer disc 12. The number of the foil type elastic parts on each outer disc may be plural (four as shown in FIG. 3a and FIG. 3b), they are uniformly distributed along the inner end face of the outer disc.

Figure 4:
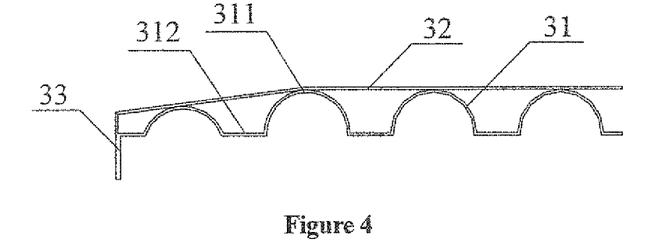
FIG. 4 is a schematic cross-sectional view of a foil type elastic part as described in embodiment 1.
Figure 5:
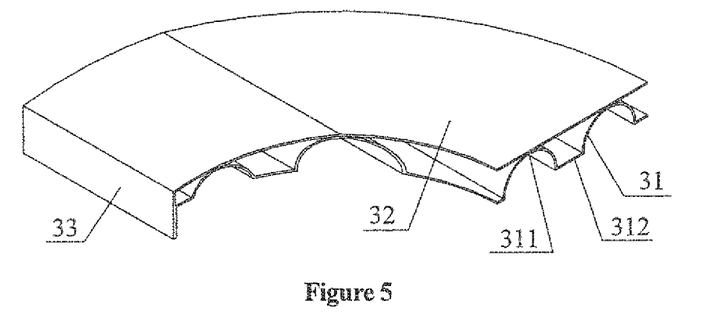
FIG. 5 is a three-dimensional schematic diagram of a foil type elastic part as described in embodiment 1.
Figure 6A:
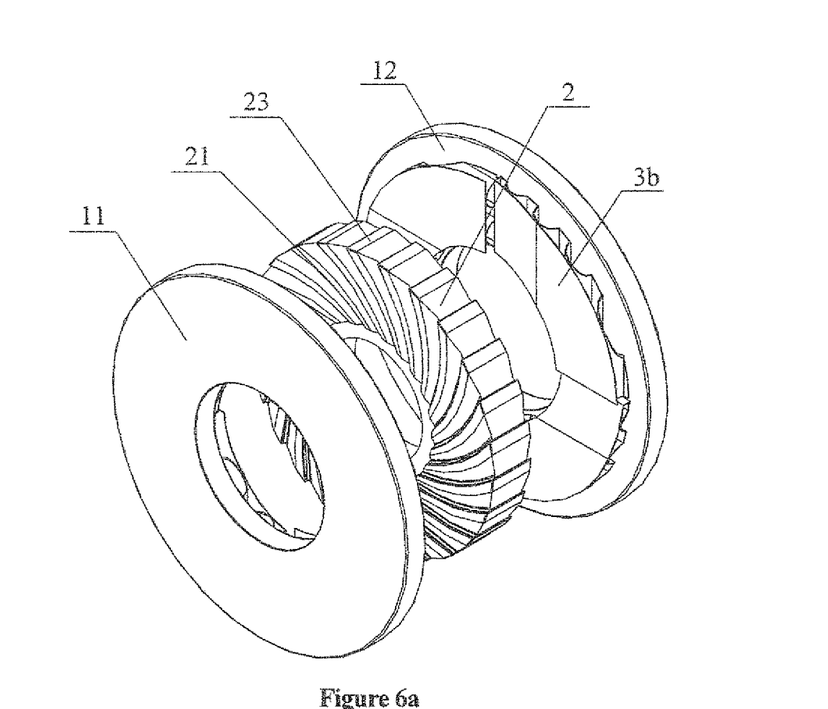
FIG. 6a is a left-view three-dimensional schematic diagram of a hybrid dynamic pressure gas thrust bearing according to embodiment 2 of the present invention.
Figure 6B:
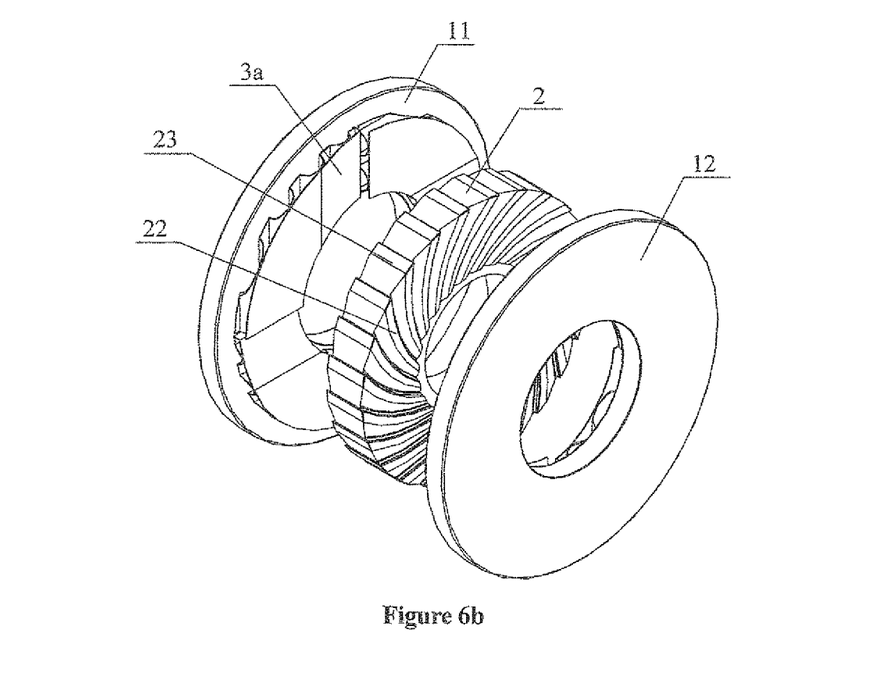
FIG. 6b is a right-view three-dimensional schematic diagram of a hybrid dynamic pressure gas thrust bearing provided by embodiment 2.

In combination with FIG. 1 and FIG. 4, FIG. 5, the foil type elastic part 3 can be composed of a wave foil 31 and a flat foil 32, the top end of the arc-shaped protrusion 311 of the wave foil 31 is attached to the flat foil 32, the wave arch transition bottom edge 312 of the wave foil 31 is attached to the inner end face of the corresponding outer disc 1; at least one end of each foil type elastic part 3 is fixed in the inner end face of the corresponding outer disc (shown in the embodiment, one end of each foil type elastic part 3 is fixed, as shown the 33 in the figure, and the other end is a free end).

Example 2

Figure 9:
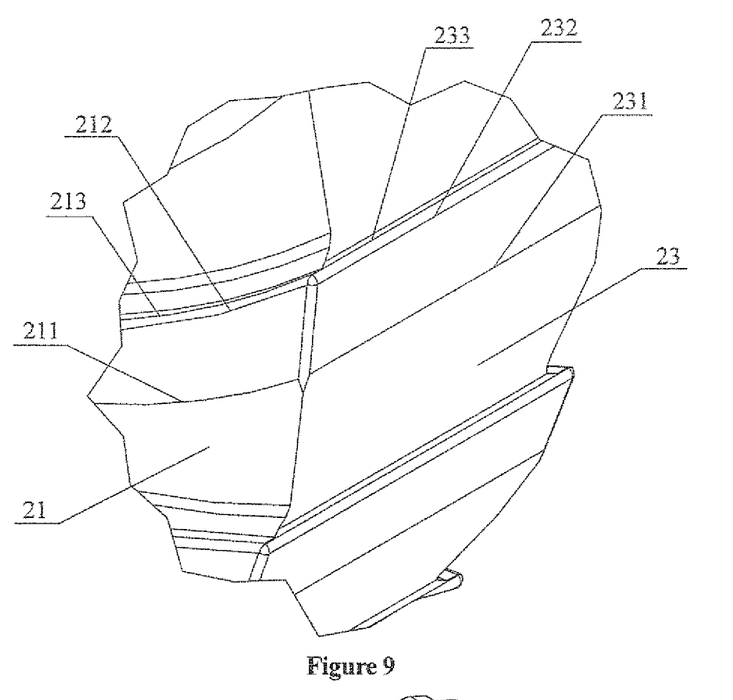
FIG. 9 is an enlarged view of the part A in FIG. 8.
Figure 10:
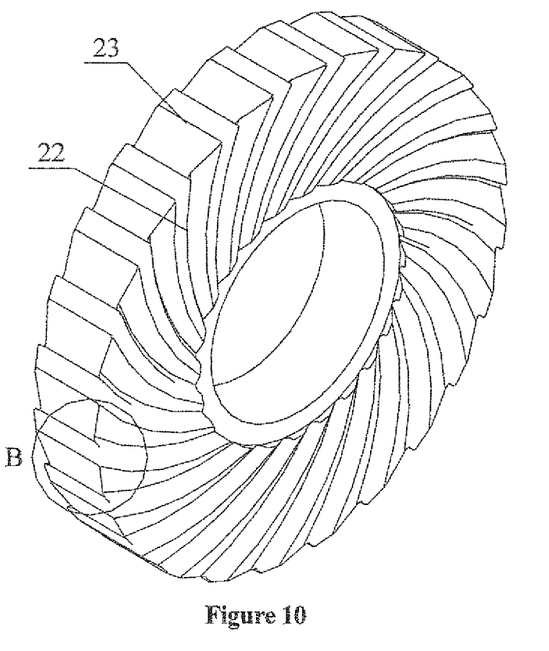
FIG. 10 is a schematic diagram of a right-view three-dimensional of the inner disc according to embodiment 2.
Figure 11:
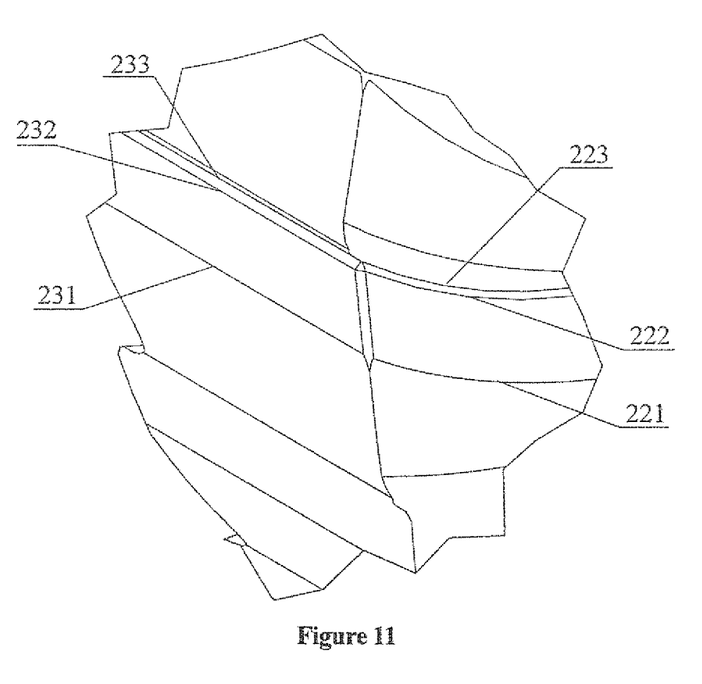
FIG. 11 is an enlarged view of the part B in FIG. 10.

As shown in FIGS. 6a, 6b, 7, 8 and 10, the only difference from the hybrid dynamic pressure gas thrust bearing in the first embodiment is that the groove-type patterns 23 are also arranged in the outer circumferential face of the inner disc 2, and the shape of the groove-type pattern 23 in the outer circumferential face is the same as the shapes of the groove-type patterns (21, 22) in the left and the right end faces (in the embodiment, the shape of the groove-type patterns are all the shape of the impeller), and an axial contour lines of the groove-type patterns 23 in the outer circumferential face and the groove-type patterns (21, 22) in the left and the right end faces are in one-to-one correspondence and are connected with each other; namely, The axial high-position lines 231 of the groove-type patterns 23 in the outer circumferential face correspond to the radial high-position lines 211 of the groove-type patterns 21 in the left end face, and are connected with each other in front of the circumferential chamfer in the end face; and the axial middle-position lines 232 of the groove-type patterns 23 in the outer circumferential face correspond to the radial middle-position lines 212 of the groove-type patterns 21 in the left end face, and are connected with each other in front of the circumferential chamfer in the end face; and the axial low-position lines 233 of the groove-type patterns 23 in the outer circumferential face correspond to the radial low-position lines 213 of the groove-type patterns 21 in the left end face, and are connected with each other in front of the circumferential chamfer in the end face (as shown in FIG. 9);

The axial high-position lines 231 of the groove-type patterns 23 in the outer circumferential face correspond to the radial high-position lines 221 of the groove-type patterns 22 in the right end face, and are connected with each other in front of the circumferential chamfer in the end face; and the axial middle-position lines 232 of the groove-type patterns 23 in the outer circumferential face correspond to the radial middle-position lines 222 of the groove-type patterns 22 in the right end face, and are connected with each other in front of the circumferential chamfer in the end face; and the axial low-position lines 233 of the groove-type patterns 23 in the outer circumferential face correspond to the radial low-position lines 223 of the groove-type patterns 22 in the right end face, and are connected with each other in front of the circumferential chamfer in the end face (as shown in FIG. 11).

Figure 7:
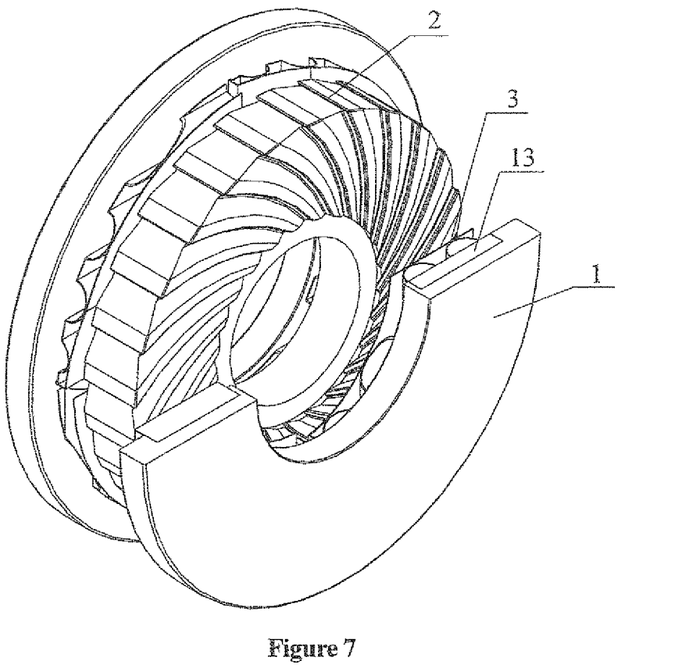
FIG. 7 is a schematic diagram of a partial division three-dimensional of a hybrid dynamic pressure gas thrust bearing provided by embodiment 2.
Figure 8:
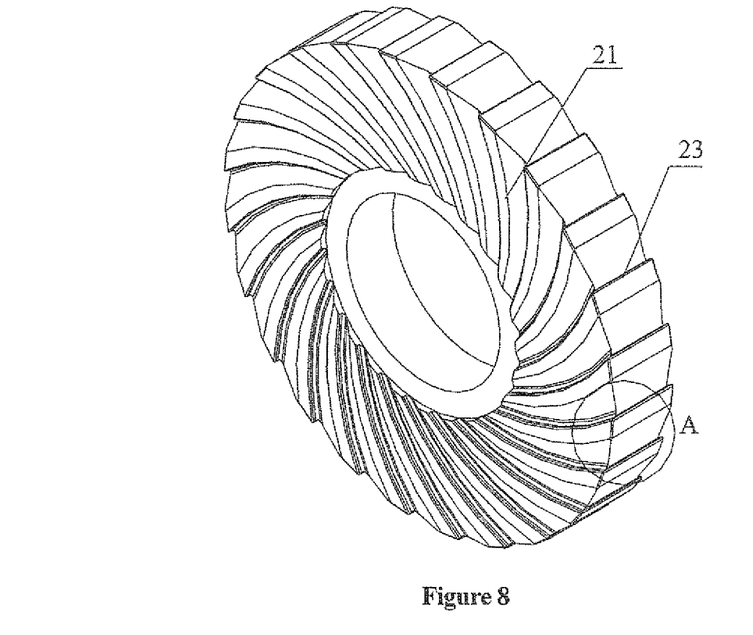
FIG. 8 is a schematic diagram of a left-view three-dimensional of the inner disc according to embodiment 2.

The inner end face of the outer disc 1 is provided with a clamping groove 13 for fixing the foil type elastic part 3 (as shown in FIG. 7).

By providing with a foil type elastic part 3 arranged between the outer disc 1 and the inner disc 2, and the groove-type patterns of regular shape arranged in the left end face and the right end face of the inner disc 2, and the groove-type pattern 21 in the left end face is in mirror symmetry with the groove-type pattern 22 in the right end face, so that the hybrid dynamic pressure gas thrust bearing is obtained, which has the rigidity characteristic of the high-limit rotating speed of the groove-type dynamic pressure gas thrust bearing, and has the flexible characteristic of the high impact resistance and the load capacity of the foil type dynamic pressure gas thrust bearing; Due to a wedge-shaped space is formed between the foil type elastic part 3 and the inner disc 2, when the inner disc 2 rotates, the gas is driven and compressed into the wedge-shaped space due to the viscosity action of the gas, so that the axial dynamic pressure can be obviously enhanced. Compared with an existing simple foil type dynamic pressure gas thrust bearing, the hybrid dynamic pressure gas thrust bearing can increase the limit rotating speed by times under the same load; meanwhile, due to the foil type elastic part 3, under the elastic action of the foil type elastic part 3, the load capacity, the impact resistance and the capability of inhibiting the axial vortex are all remarkably improved. Compared with an existing simple groove-type dynamic pressure gas thrust bearing, the hybrid dynamic pressure gas thrust bearing can increase the impact resistance and the load capacity in a multiplied mode at the same rotating speed. Particularly, when the groove-type patterns 23 are also arranged in the outer circumferential face of the inner disc 2, and the shape of the groove-type pattern 23 in the outer circumferential face is the same as the groove-type pattern 21 in the left end face and the groove-type pattern 22 in the right end face, and the axial contour lines of the groove-type patterns 23 in the outer circumferential face and the radial contour lines of the groove-type patterns (21, 22) in the left end and the right end faces are in one-to-one correspondence and are connected with each other, so that the pressurized air generated by the groove-type patterns (21 and 22) in the left and right end faces of the inner disc 2 is continuously conveyed from a center of the shaft along the radial direction into groove-type-like channels formed by the groove-type patterns 23 in the outer circumferential face, and the required air film to provide a stronger support to the high-speed running bearing can be formed, and the air film serves as a lubricant for the dynamic pressure gas thrust bearing, then the high-speed stable operation of the hybrid dynamic pressure gas thrust bearing under the air floatation state can be ensured, and provides a further guarantee for achieving the high-limit rotating speed.

In addition, the foil type elastic part 3 is preferably subjected to surface heat treatment, so that the performance requirements of high-speed operation can be better met; the matching clearance between the foil type elastic part 3 and the inner disc 2 is preferably 0.003-0.008 mm, so that the reliability and the stability of high-speed operation of the bearing can be further ensured.

Other, the structure of the foil type elastic part 3 is not limited to that of the above embodiment, so as to meet the substantive requirements of the present invention as long as the matching relation between the inner disc and the outer disc is ensured.

Through the test, the hybrid dynamic pressure gas thrust bearing provided by the invention can be realized the limit rotating speed of 200,000 rpm to 450,000 rpm under a load of 1-3 kg, but the existing dynamic pressure gas thrust bearing can only achieve a load capacity of 0.5-1.5 kg, the maximum limit rotating speed can only reach 100,000 rpm to 200,000 rpm. It can be seen that the present invention can realize the application of dynamic pressure gas thrust bearings in ultra high-speed areas under larger loads. Compared with the prior art, the present invention has made significant progress, and made the study of the dynamic bearing gas thrust bearing technology take a new step.

At last, it is noted here that the above disclosure is intended merely to describe the subject matter of the present invention in further detail and is not to be construed as limiting the scope of the invention. Non-substantive improvements and modifications made by those skilled in the art in accordance with the above disclosure all fall within the scope of the present invention.

What is claimed is:

1. A hybrid dynamic pressure gas thrust bearing, comprising:
    two outer discs,
    an inner disc clamped between the two outer discs, and
    a plurality of foil type elastic parts, each foil type elastic part arranged between each outer disc and the inner disc, the inner disc comprising two end faces and an outer circumferential face, and each of the two end faces of the inner disc is provided with a regular groove-type pattern, and the groove-type pattern on one end face is in mirror symmetry with the groove-type pattern on the other end face, wherein the groove-type pattern is also provided on the outer circumferential face of the inner disc, and wherein the groove-type pattern on each of the end faces comprises a plurality of radial contour lines, and the groove-type pattern on the outer circumferential face comprises a plurality of axial contour lines, and the axial contour lines of the groove-type pattern on the outer circumferential face and radial contour lines of the groove-type patterns on the each of the end faces are in one-to-one correspondence and are connected with each other, and the axial contour lines and the radial contour lines are of a same shape.

2. The hybrid dynamic pressure gas thrust bearing according to claim 1, wherein the axial contour lines in the groove-type pattern on the outer circumferential face comprises axial high-position lines, axial middle-position lines and axial low-position lines and the radial contour lines in the groove-type pattern on each of the end faces comprises radial high-position lines, radial middle-position lines and radial low-position lines, and wherein
    the axial high-position lines of the groove-type pattern on the outer circumferential face correspond to the radial high-position lines of the groove-type pattern on each of the end faces, and are connected with each other at a circumferential chamfer on each of the end faces;
    the axial middle-position lines of the groove-type pattern on the outer circumferential face correspond to the radial middle-position lines of the groove-type pattern on each of the end faces, and are connected with each other at the circumferential chamfer on each of the end faces; and
    the axial low-position lines of the groove-type pattern on the outer circumferential face correspond to the radial low-position lines of the groove-type pattern on each of the end faces, and are connected with each other at the circumferential chamfer on each of the end faces.

3. The hybrid dynamic pressure gas thrust bearing according to claim 2, wherein the groove-type pattern is of an impeller shape.

4. The hybrid dynamic pressure gas thrust bearing according to claim 1, wherein a fit clearance between said each foil type elastic part and the inner disc is 0.003-0.008 mm.

5. The hybrid dynamic pressure gas thrust bearing according to claim 1, wherein each of the outer discs has an inner end face, and at least one end of each foil type elastic part is fixed on the inner end face of the corresponding outer disc.

6. The hybrid dynamic pressure gas thrust bearing according to claim 5, wherein the foil type elastic part fixed on each outer disc comprise multiple parts uniformly distributed along the inner end face of the corresponding outer disc.

7. The hybrid dynamic pressure gas thrust bearing according to claim 5, wherein the foil type elastic part fixed on one outer disc is in mirror symmetry with the foil type elastic part fixed on the other outer disc.

8. The hybrid dynamic pressure gas thrust bearing according to claim 5, wherein a clamping groove formed on the inner face of each outer disc is used for fixing the foil type elastic part on the corresponding the outer disc.

9. The hybrid dynamic pressure gas thrust bearing according to claim 1, the foil type elastic parts are subjected to surface heat treatment.

10. The hybrid dynamic pressure gas thrust bearing according to claim 1, wherein each foil type elastic part is composed of a wave foil and a flat foil, the wave foil having an arc-shaped protrusion with a top end and a transition bottom edge, and wherein the top end of the arc-shaped protrusion of the wave foil is arranged to contact the flat foil, and the transition bottom edge of the wave arch of the wave foil is arranged to contact the inner end face of the corresponding outer disc.

* * * * *